W. N. BOOTH.
DEMOUNTABLE RIM SUPPORT FOR MOTOR VEHICLES.
APPLICATION FILED JULY 23, 1917.
1,354,161.
Patented Sept. 28, 1920.
2 SHEETS—SHEET 2.
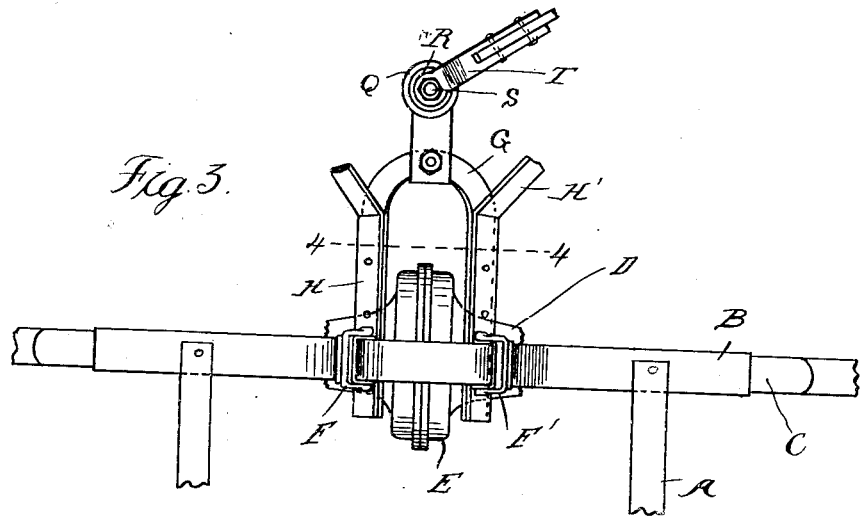
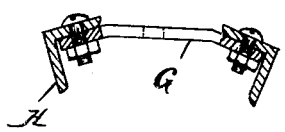
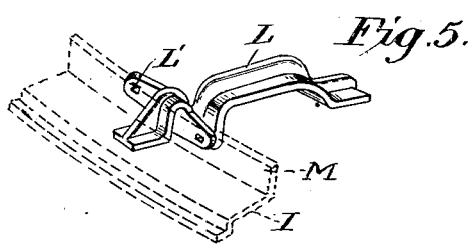
William N. Booth, Inventor
By Whittemore, Hulbert & Whittemore
Attorneys

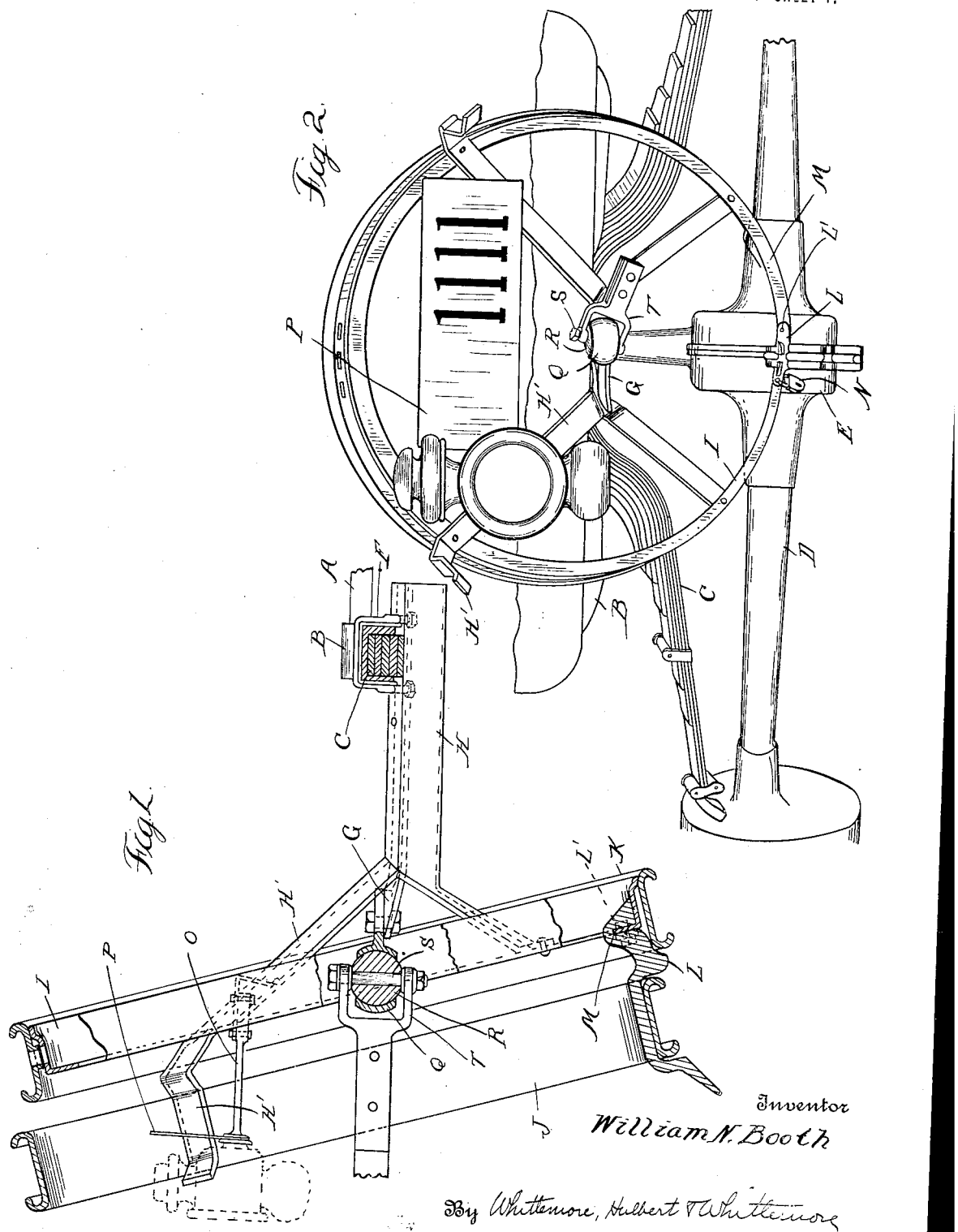

UNITED STATES PATENT OFFICE.

WILLIAM N. BOOTH, OF DETROIT, MICHIGAN.

DEMOUNTABLE-RIM SUPPORT FOR MOTOR-VEHICLES.

1,354,161.        Specification of Letters Patent.    Patented Sept. 28, 1920.

Application filed July 23, 1917. Serial No. 182,179.

*To all whom it may concern:*

Be it known that I, WILLIAM N. BOOTH, a citizen of the United States of America, residing at Detroit, in the county of Wayne and State of Michigan, have invented certain new and useful Improvements in Demountable-Rim Supports for Motor-Vehicles, of which the following is a specification, reference being had therein to the accompanying drawings.

The invention relates to tire or rim supports for use on motor vehicles, and it is the object of the invention to obtain a construction which is particularly applicable to the type of car having a transversely extending spring supported upon the rear axle and centrally clipped to the rear cross bar of the frame. It is a further object to combine with the tire and rim-support a trailer draft connection, and further a mounting for the rear light and license-holder as hereinafter set forth.

In the drawings:

Figure 1 is a longitudinal sectional view of a construction embodying my invention;

Fig. 2 is a perspective view thereof;

Fig. 3 is a top plan view thereof with parts omitted; and

Fig. 4 is a cross sectional view upon the line 4—4 of Fig. 3;

Fig. 5 is a perspective view of the rim-locking device.

In the type of car to which my construction is particularly applicable the vehicle frame A is provided with a rear cross-bar B, which is centrally clipped to a transversely-extending spring C supported upon the axle D and both members being centrally bowed upward to provide clearance for the differential housing E. The spring C is attached to the cross-bar B by clips which engage the bowed portions thereof and are radially arranged in relation thereto, the clip-plates being arranged below the spring. My improved tire and rim holder is attached to the vehicle by means of the clips F and F' and is of the following construction: G is a strap having parallel arm portions spaced to register with the clips F and F' and being apertured for engagement therewith. H are angle bars arranged parallel to the arms of the strap G and correspondingly apertured for engagement with the clip. The rear portions of the angle arms H are split longitudinally at the angle and the separate sides thereof are bent upward and downward in an oblique direction, being attached at their outer ends to an annular holder I for one or more demountable rims. As shown, this annular holder I is of a cross-section corresponding to the felly band of the wheel, permitting of laterally engaging the rim therewith. Some of the arms H' of the split angle bars H are extended outward beyond the point of attachment to the ring I and are suitably fashioned to form a support for an additional rim, as indicated at J. The demountable rims, such as K, are locked in position by a rotatable member L pivotally secured at L' to a lug or flange M on said member I. Thus by rotating the member L inward the rims K may be readily engaged with or disengaged from the member I or extension supporting arms H', but when the member L is rotated downward it will embrace said rims and hold the same from engagement. In this position the member L may be locked by any suitable means, such as the padlock N also engaging the flange M.

The placing of the tire-holder such as described in position on the vehicle frame will interfere with the normal arrangement of the rear light and license-number holder. I have therefore provided a substitute support for these parts comprising a bracket O riveted or otherwise secured to one of the arms H' and adapted to receive the lamp and license plate P when detached from its normal location on the frame. This will arrange the lamp and license in rear of the rims and in a position where they will not interfere therewith.

It is frequently desirable to attach a trailer to a machine, and I have therefore combined with my rim-supporting device a trailer draft connection. As shown, the strap G has secured to the rear end thereof a spherical socket member Q with a ball R in engagement therewith, said ball being centrally apertured for the passage of a bolt S which secures a bifurcated draft-bar T thereto. The draft-bar T may be permanently attached to the tongue of the trailer and at any time it may be coupled with or uncoupled from the ball R by disengaging the bolt S.

With the construction as described, to attach the same to the motor vehicle the clips are loosened and the clip-plates removed therefrom, being replaced by the strap G and angle bars H, these parts being riveted to each other. When securely clamped the strap and angle bars will project rearward and the split arms H' will extend in oblique position, holding the annular member I in an inclined plane in rear of the car body. The angle bars impart strength and rigidity to the rearwardly-extending strap, while the arms H' being arranged in different oblique planes form rigid brace connections to ring I. At the same time the strap G is so securely fastened to the cross-bar D of the frame that it will form a strong draft connection to the trailer. Furthermore the trailer draft connection is arranged within the circle of the ring I in a position to be free from interference with attachment and detachment of the demountable rims.

What I claim as my invention is:

1. In a motor vehicle, the combination with a frame having a rear cross-bar, a spring for supporting the same and clips for securing said frame to said cross-bar, of a tire-holder in rear of said frame, and a support for said tire-holder comprising angle bars secured by said clips, the rear ends thereof being split and bent to form supporting braces for said holder.

2. In a motor vehicle, the combination with the frame having a rear cross-bar, a supporting spring therefor, said cross-bar and spring being upwardly bowed, and clips for securing the same to each other; of a tire-holder in rear of said frame, angle bars secured by said clips extending rearwardly therefrom, the end portions of said bars being split and bent to form inclined braces for supporting said tire-holder, and a trailer draft connection extending rearwardly from said frame and secured by said clips, said draft connection attached to said bars and reinforced thereby.

3. In a motor vehicle, the combination with a frame, of a tire-holder in rear of said frame, a bracket secured to said frame extending rearward therefrom and supporting said tire-holder, and a trailer draft connection also secured to said frame and extending rearward therefrom, said draft connection secured to said bracket and reinforced thereby.

4. In a motor vehicle, the combination with a frame, of a tire-support in rear of said frame, comprising an annular bearing and angle bars secured to said frame extending rearward therefrom, having their end portions split and bent to form inclined braces secured to and supporting said annular bearing.

5. In a motor vehicle, the combination with a frame, of a tire-support in rear of said frame comprising an annular bearing, angle bars secured to said frame extending rearward therefrom, the end portions of said bars being split and bent to form inclined braces secured to and supporting said annular frame, and a strap secured to and connecting the rearwardly extending portions of said angle bars, said strap forming a trailer draft connection.

6. In a motor vehicle, the combination with a frame, of a tire-support in rear of said frame comprising an annular bearing, angle bars secured to said frame and extending in parallelism rearward therefrom, the rear portion of said bars being split at the angle and bent upwardly to form inclined braces secured to and supporting said annular bearing, and a strap having parallel portions secured to one of the flanges of each of said angle bars, said strap forming a trailer draft connection.

7. A tire-support for motor vehicles, comprising an annular bearing member, and a pair of angle bars extending transversely to the plane of said annular bearing member, the end portions of said bars being split at the angle and bent oppositely and obliquely to form brace connections to said annular bearing member.

8. A tire-support comprising an annular member, angle bars for supporting the same having split portions bent to form braces extending to different portions of said annular member, one or more of said braces being extended to form an additional tire support, and coöperating rotatable means for locking the tires to said annular member and additional support, said means being movable into locking engagement in the plane of the tires.

9. A tire-holder comprising an annular member, angle bars extending transversely to the plane of said annular member, having split portions bent to form inclined braces secured to said annular member, one or more of said braces being extended to form an additional tire support, and a rotatable member pivoted to a different portion of said annular bearing member for securing the tires on said annular support and additional support, said member being movable into securing engagement in the plane of the tires.

10. In a motor vehicle, the combination with a tire-holder, of a support for said tire-holder comprising angle bars having their outer ends split and diverging to form supporting braces for said tire-holder.

In testimony whereof I affix my signature.

WILLIAM N. BOOTH.